United States Patent
Nozoe et al.

(10) Patent No.: US 11,444,282 B2
(45) Date of Patent: Sep. 13, 2022

(54) POSITIVE ELECTRODE MATERIAL FOR LITHIUM ION SECONDARY BATTERY, POSITIVE ELECTRODE FOR LITHIUM ION SECONDARY BATTERY, AND LITHIUM ION SECONDARY BATTERY

(71) Applicant: SUMITOMO OSAKA CEMENT CO., LTD., Tokyo (JP)

(72) Inventors: Tsutomu Nozoe, Chiba (JP); Toyomasa Nakano, Chiba (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 218 days.

(21) Appl. No.: 17/030,899

(22) Filed: Sep. 24, 2020

(65) Prior Publication Data
US 2021/0305571 A1  Sep. 30, 2021

(30) Foreign Application Priority Data
Mar. 30, 2020 (JP) .............................. JP2020-060219

(51) Int. Cl.
*H01M 4/587* (2010.01)
*H01M 4/36* (2006.01)
(Continued)

(52) U.S. Cl.
CPC ........... *H01M 4/587* (2013.01); *H01M 4/366* (2013.01); *H01M 4/5825* (2013.01);
(Continued)

(58) Field of Classification Search
None
See application file for complete search history.

(56) References Cited

U.S. PATENT DOCUMENTS

2012/0088156 A1  4/2012 Nomoto et al.
2012/0183839 A1  7/2012 Yuasa et al.
(Continued)

FOREIGN PATENT DOCUMENTS

CN    102683698    3/2015
JP    2001-167763  6/2001
(Continued)

OTHER PUBLICATIONS

EESR issued in EP Patent Application No. 20198084.4, dated Mar. 19, 2021 (previously submitted).
(Continued)

*Primary Examiner* — Wyatt P McConnell
(74) *Attorney, Agent, or Firm* — Greenblum & Bernstein, P.L.C.

(57) ABSTRACT

A positive electrode material for a lithium ion secondary battery containing carbon, in which, when a peak of the carbon that is measured by Raman scattering and is present at 2200 to 3400 $cm^{-1}$ is peak-separated into peaks including five types of Voigt functions of a peak 1 having a peak top present at 2200 to 2380 $cm^{-1}$, a peak 2 having a peak top present at 2400 to 2550 $cm^{-1}$, a peak 3 having a peak top present at 2600 to 2750 $cm^{-1}$, a peak 4 having a peak top present at 2850 to 2950 $cm^{-1}$, and a peak 5 having a peak top present at 3100 to 3250 $cm^{-1}$, an average of proportions of Gaussian functions in the peak 3 and the peak 4 is 90% or more and less than 100%.

7 Claims, 2 Drawing Sheets

(51) Int. Cl.
*H01M 4/58* (2010.01)
*H01M 4/62* (2006.01)
*H01M 10/0525* (2010.01)
*H01M 4/02* (2006.01)

(52) U.S. Cl.
CPC ....... *H01M 4/625* (2013.01); *H01M 10/0525* (2013.01); *H01M 2004/021* (2013.01); *H01M 2004/028* (2013.01)

(56) References Cited

U.S. PATENT DOCUMENTS

| | | | |
|---|---|---|---|
| 2012/0244334 A1* | 9/2012 | Park | H01G 11/50 |
| | | | 428/221 |
| 2012/0301780 A1 | 11/2012 | Kitagawa et al. | |
| 2014/0001413 A1 | 1/2014 | Otsuki et al. | |
| 2015/0333319 A1 | 11/2015 | Kawamura et al. | |
| 2015/0380734 A1 | 12/2015 | Kitagawa et al. | |
| 2017/0110720 A1 | 4/2017 | Hersam et al. | |
| 2018/0254517 A1 | 9/2018 | Hersam et al. | |
| 2020/0168912 A1 | 5/2020 | Kubota et al. | |

FOREIGN PATENT DOCUMENTS

| | | |
|---|---|---|
| JP | 2011-076820 | 4/2011 |
| JP | 2012-099467 | 5/2012 |
| JP | 2012-216409 | 11/2012 |
| JP | 2012-248378 | 12/2012 |
| JP | 5743011 | 5/2015 |
| JP | 2016-189321 | 11/2016 |
| JP | 2017-142997 | 8/2017 |
| JP | 6237617 | 11/2017 |
| JP | 2018-530898 | 10/2018 |
| JP | 2019-019014 | 2/2019 |
| JP | 2019-169283 | 10/2019 |
| JP | 2020-508541 | 3/2020 |
| KR | 10-2017-0084472 | 7/2017 |

OTHER PUBLICATIONS

Office Action issued in JP Patent Application No. 2020-060219, dated Feb. 9, 2021.

Wang J-X et al., Synthesis and performance of $LiVPO_4F/C$-based cathode material for lithium ion battery, ScienceDirect, Trans. Nonferrous Met. Soc. China 2 3(2013) pp. 1718-1722.

Wu X et al., Sol-gel synthesis of $LiCoPO_4F/C$ nanocomposite as a high power cathode material for lithium ion batteries, Journal of Power Sources 220 (2012) pp. 122-129.

Noh M et al., Amorphous Carbon-Coated Tin Anode Material for Lithium Secondary Battery, Chem. Mater. 2005, 17, pp. 1926-1929.

Sharma N et al., Carbon-Coated Nanophase $CaMoO_4$ as Anode Material for Li Ion Batteries, Chem. Mater. 2004, 16, pp. 504-512.

Official Communication issued in Japan Patent Application No. 2020-060219, dated Sep. 15, 2020.

EESR issued in EP Patent Application No. 20198084, dated Mar. 19, 2021.

* cited by examiner

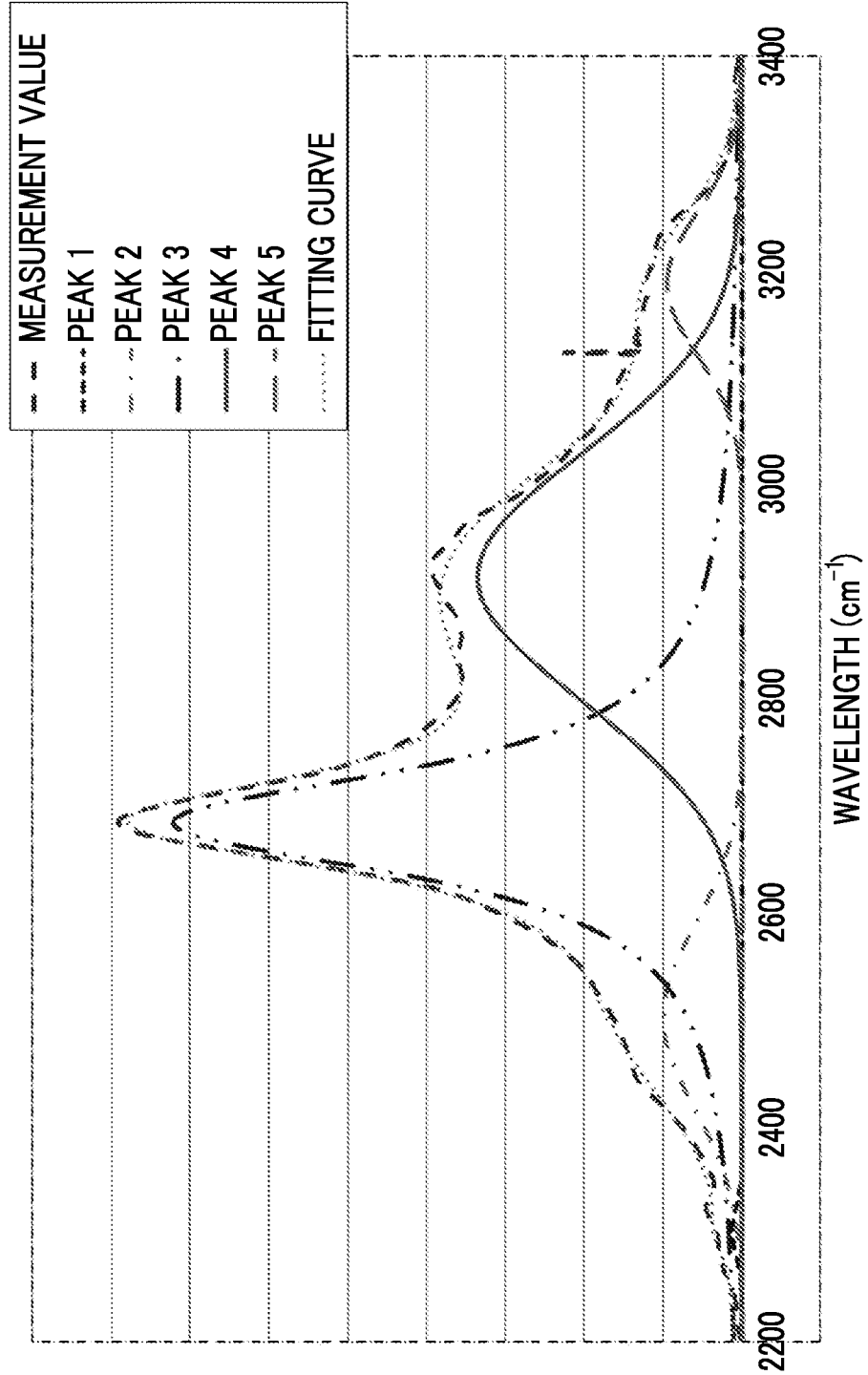

POSITIVE ELECTRODE MATERIAL FOR LITHIUM ION SECONDARY BATTERY, POSITIVE ELECTRODE FOR LITHIUM ION SECONDARY BATTERY, AND LITHIUM ION SECONDARY BATTERY

CROSS-REFERENCE TO RELATED APPLICATIONS

This application claims the benefit of Japanese Patent Application No. 2020-060219 filed Mar. 30, 2020, the disclosure of which is herein incorporated by reference in its entirety.

BACKGROUND OF THE INVENTION

Field of the Invention

The present invention relates to a positive electrode material for a lithium ion secondary battery, a positive electrode for a lithium ion secondary battery, and a lithium ion secondary battery.

Description of Related Art

Lithium ion secondary batteries have a higher energy density and a higher power density than lead batteries and nickel-hydrogen batteries and are used in a variety of uses such as small-sized electronic devices such as smartphones and the like, domestic backup power supply, electric tools, and the like. In addition, attempts are underway to put high-capacity lithium ion secondary batteries into practical use for recyclable energy storage such as photovoltaic power generation, wind power generation, and the like.

For example, Japanese Patent No. 6237617 discloses, for the purpose of obtaining a positive electrode material for a lithium ion battery having electron conductivity improved while suppressing inhibition of the intercalation and deintercalation of lithium ions into and from active material particles, a positive electrode active material-graphene composite particle that is a composite particle-like positive electrode material for a lithium ion battery in which positive electrode active material particles and a matrix containing graphene are conjugated to each other, in which the positive electrode active material particles are dispersed and distributed in the matrix, the carbon element proportion (%) on the surface of the material, which is measured by X-ray photoelectron measurement, is 5% or more and 50% or less, the carbon element proportion (%) in the entire material is 2% or more and 20% or less, and a value obtained by dividing the carbon element proportion (%) on the surface of the material by the carbon element proportion (%) in the entire material is 1.5 or more and 7 or less.

Japanese Laid-open Patent Publication No. 2012-099467 discloses, for the purpose of obtaining a power storage device having a large capacity per weight or per volume, a method for producing a positive electrode active material for a power storage device, in which raw materials that are to form a positive electrode active material are mixed together to produce a mixture, first calcination is carried out, the mixture is crushed, graphene oxide is added to the crushed mixture, and second calcination is carried out, whereby a reaction product is formed, simultaneously, the graphene oxide is reduced, and the surface of the reaction product is coated with graphene.

Furthermore, Japanese Patent No. 5743011 discloses, for the purpose of obtaining an electrode material for which an electrode active material having a carbonaceous film formed on the surface is used and which is capable of suppressing voltage drop at the time of carrying out high-speed discharging in a low-temperature environment, a particulate electrode material obtained by forming a carbonaceous film on the surfaces of electrode active material particles having an olivine-type crystal structure, in which the average of the discharge capacity ratios between a 35 C discharge capacity of a single particle of the electrode material at $-10°$ C. and a 1 C discharge capacity of the single particle of the electrode material at $-10°$ C. is 0.50 or more, and an XRD (CuK$\alpha$ ray source) peak of a (002) plane attributed to a graphene layer in the carbonaceous film appears at $2\theta=25.7°$ or less.

SUMMARY OF THE INVENTION

In olivine-based positive electrode materials, olivine-type phosphate is generally used as the positive electrode active material, a carbonaceous film is provided on the outermost surface layer portions of the primary particles and the granulated bodies of the active material in many structures, and the carbonaceous film plays an important role of the intercalation and deintercalation of lithium ions from and into the inside and electron conduction.

Here, in a case where a carbon source was calcinated as it was as in Patent Documents 1 and 2, carbon in the carbonaceous film had a highly crystalline graphene structure and was likely to inhibit the intercalation and deintercalation of lithium ions. Furthermore, in a case where carbon is highly crystalline, the flexibility of carbon becomes poor with respect to the volume change of the positive electrode active material, which is an olivine-type phosphate, at the time of charging and discharging, which causes the carbonaceous film to peel off from the positive electrode active material. In Japanese Patent No. 5743011, the crystallinity of graphene was defined by the refractive index, but the crystallinity was high enough to be detected by X-ray diffraction (XRD), and there was a need for additional improvement. In addition, in a region where the formation of graphene, in which the intercalation and deintercalation of lithium ions were easy, did not proceed, the electron conductivity was low, and the electric resistance was likely to increase. Furthermore, the carbonaceous film was soft in the region, which caused the carbonaceous film to be peeled off from the positive electrode active material due to a shear force generated at the time of producing a paste for forming a positive electrode.

The present invention has been made in consideration of the above-described circumstances, and an object of the present invention is to provide a lithium ion secondary battery having excellent charging and discharging characteristics and excellent cycle characteristics, a positive electrode material for a lithium ion secondary battery and a positive electrode for a lithium ion secondary battery with which the above-described battery can be obtained.

As a result of intensive studies for solving the above-described problem, the present inventors found that the softness of carbon that is contained in a positive electrode material for a lithium ion secondary battery can be adjusted by controlling the proportion of the Gaussian function of a specific peak that is obtained by the Raman scattering measurement of the carbon, and thus it is possible to improve the charging and discharging characteristics and the cycle characteristics of a lithium ion secondary battery.

The present invention was completed based on such a finding.

That is, the present invention provides [1] to [7] below.

A positive electrode material for a lithium ion secondary battery containing carbon, in which, when a peak of the carbon that is measured by Raman scattering and is present at 2200 to 3400 cm−1 is peak-separated into peaks including five types of Voigt functions of a peak 1 having a peak top present at 2200 to 2380 cm−1, a peak 2 having a peak top present at 2400 to 2550 cm−1, a peak 3 having a peak top present at 2600 to 2750 cm−1, a peak 4 having a peak top present at 2850 to 2950 cm−1, and a peak 5 having a peak top present at 3100 to 3250 cm−1, an average of proportions of Gaussian functions in the peak 3 and the peak 4 is 90% or more and less than 100%.

The positive electrode material for a lithium ion secondary battery according to [1], in which, in the peak separation, a coefficient of determination with the measured peak of Raman scattering of carbon may be 0.998 or more.

The positive electrode material for a lithium ion secondary battery according to [1] or [2], in which, in the peak separation, an intensity of the peak top of the peak 4 may be a highest, a full width at half maximum of the peak 3 may be 150 $cm^{-1}$ or more and 330 $cm^{-1}$ or less, and a full width at half maximum of the peak 4 may be 280 $cm^{-1}$ or more and 360 $cm^{-1}$ or less.

The positive electrode material for a lithium ion secondary battery according to any one of [1] to [3], further containing an active material including an olivine-structured primary particle coated with a carbonaceous film containing the carbon or a granulated body thereof, in which an amount of the carbon may be 0.5% by mass or more and 7% by mass or less.

The positive electrode material for a lithium ion secondary battery according to any one of [1] to [4], in which a crystallite diameter analyzed by X-ray diffraction may be 50 nm or more and 250 nm or less.

A positive electrode for a lithium ion secondary battery including an electrode current collector and a positive electrode mixture layer formed on the electrode current collector, in which the positive electrode mixture layer contains the positive electrode material for a lithium ion secondary battery according to any one of [1] to [5].

A lithium ion secondary battery having a positive electrode, a negative electrode, and a non-aqueous electrolyte, in which the positive electrode for a lithium ion secondary battery according to [6] is provided as the positive electrode.

According to the present invention, it is possible to provide a lithium ion secondary battery having excellent charging and discharging characteristics and excellent cycle characteristics, a positive electrode material for a lithium ion secondary battery and a positive electrode for a lithium ion secondary battery with which the above-described battery can be obtained.

BRIEF DESCRIPTION OF THE DRAWINGS

FIG. 2 is Raman spectra of carbon of a positive electrode material for a lithium ion secondary battery in Comparative Example 1.

DETAILED DESCRIPTION OF THE INVENTION

Figure 1:
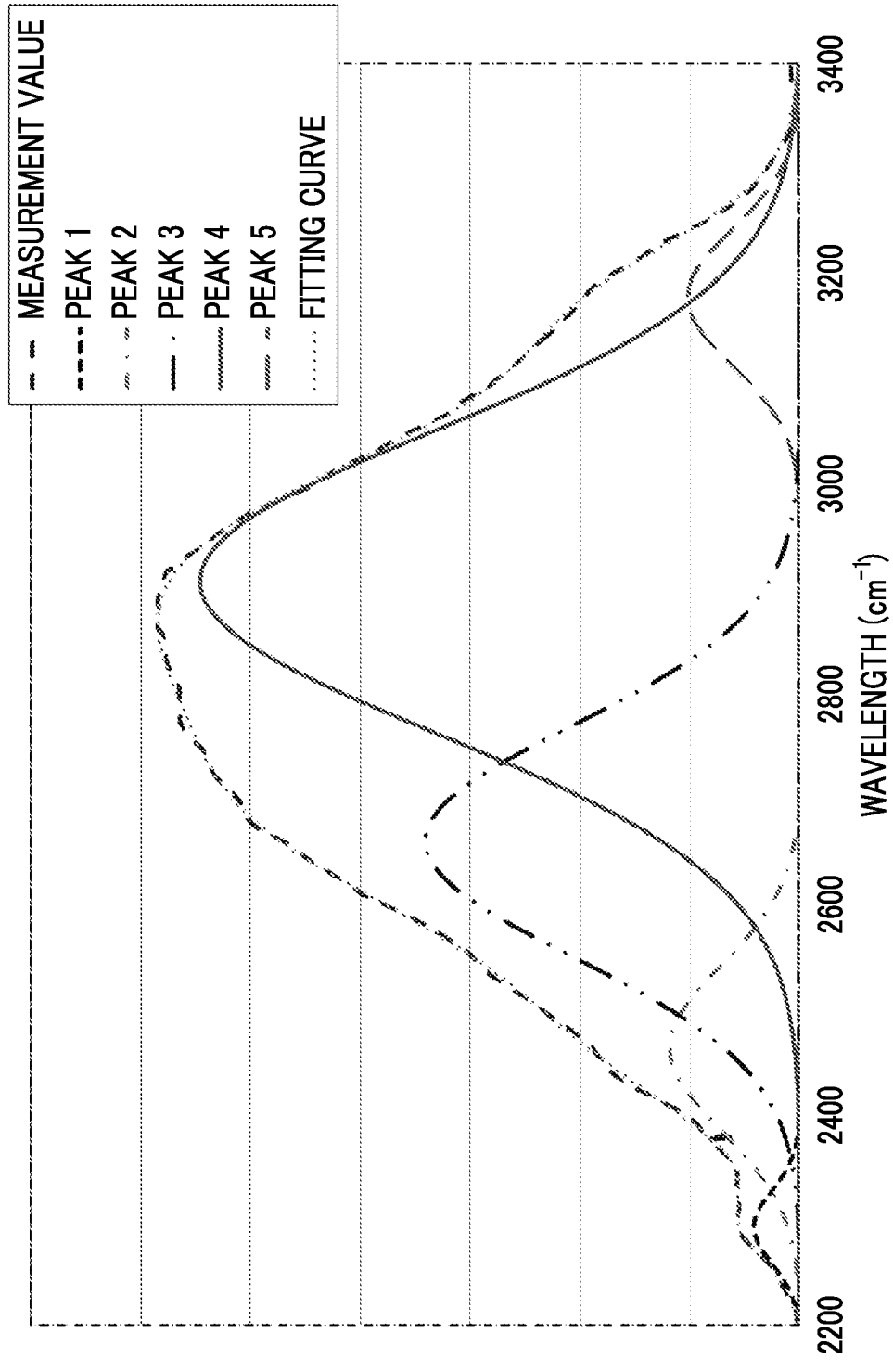
FIG. 1 is Raman spectra of carbon in a positive electrode material for a lithium ion secondary battery in Example 1.

Positive Electrode Material for Lithium Ion Secondary Battery

A positive electrode material for a lithium ion secondary battery of the present embodiment (hereinafter, also simply referred to as "positive electrode material") contains carbon, and, when the peak of the carbon that is measured by Raman scattering and is present at 2200 to 3400 cm−1 is peak-separated into peaks including five types of Voigt functions of a peak 1 having a peak top present at 2200 to 2380 cm−1, a peak 2 having a peak top present at 2400 to 2550 cm−1, a peak 3 having a peak top present at 2600 to 2750 cm−1, a peak 4 having a peak top present at 2850 to 2950 cm−1, and a peak 5 having a peak top present at 3100 to 3250 cm−1, the average of the proportions of Gaussian functions in the peak 3 and the peak 4 is 90% or more and less than 100%.

Proportion of Gaussian Function

For carbon that is contained in the positive electrode material, Raman spectra are obtained by spectroscopically measuring the carbon with Raman scattering light. In the present invention, in the Raman spectra, the peak present at 2200 to 3400 $cm^{-1}$ was separated into the peaks 1 to 5, and attention was paid to the convolutional states of the Gaussian distribution and the Lorentzian distribution of the Voigt function in the obtained peak 3 and peak 4.

The peaks 1 to 5 are considered as peaks representing the 2D bands of particulate carbon and carbon that is observed in graphene, respectively. In the particulate carbon, a plurality of peaks is observed, in which the peak 3 becomes the maximum. In single-layered graphene, a single peak appears; however, in multiple-layered graphene, a plurality of peaks is observed, in which the peak 4 becomes the maximum, due to an increase in the number of double resonance processes by the respective layers. Since carbon has a structure of coating particles and a particulate structure between particles in the positive electrode material, in the peaks of the 2D bands of the positive electrode material, the peak 3 and the peak 4 becomes peaks having the maximum intensity. In addition, since the peaks 1, 2, and 5 have low peak intensities and are thus buried by the shoulders of the peak 3 and the peak 4, the shapes of the peak 3 and the peak 4 become dominant in the peak shapes in fitting. Therefore, the height of the crystallinity of carbon of a carbon material in the positive electrode active material is calculated by calculating the proportions of the Gaussian functions of the respective peaks of the peak 3 and the peak 4 and obtaining the average thereof.

Here, in the peaks of Raman scattering light, the peak of crystalline solid is represented by the Lorentzian distribution, and the peaks of an amorphous substance and liquid are represented by the Gaussian distribution. Therefore, the peak is considered as the Voigt function, and the Voigt function is considered as the convolution of the Gaussian function and the Lorentzian function. Therefore, the crystallinity of the represented peak is calculated by calculating the proportion of the Gaussian function of the peak. In addition, the Voigt function can be calculated as a pseudo Voigt function in order to simplify the calculation.

The average of the proportions of the Gaussian functions means the average of the proportion of the Gaussian function of the peak 3 and the proportion of the Gaussian function of the peak 4 and is also referred to as Gaussian ratio.

The Gaussian ratio of each peak obtained by peak separation is theoretically obtained by curve fitting. The pseudo Voigt function is expressed by the following formula.

$$V(x) = M \times G(x) + (1-M) \times L(x)$$

$$G(x) = A\exp\left[-4|ln2\frac{(x-x_0)^2}{\omega^2}\right]$$

$$L(x) = A\frac{\omega^2}{4(x-x_0)+\omega^2}$$

V(x): Pseudo Voigt function
M: Proportion of Gaussian function
G(x): Gaussian function
L(x): Lorentzian function
A: Peak intensity
ω: Full width at half maximum of peak
x: Wave number
$x_0$: Wave number of peak top Generally, the proportion of the Gaussian function of each peak is calculated with numerical calculation software installed in a Raman spectroscopic measurement instrument (Raman microscope or the like) based on Raman spectroscopic data measured with the instrument.

When the average of the proportions of the Gaussian functions in the peak 3 and the peak 4 is less than 90%, since carbon is highly crystalline, carbon inhibits the intercalation and deintercalation of lithium ions. When the average is 100%, carbon becomes completely amorphous, and it is not possible to hold the conductivity.

From the viewpoint of further improving the charging and discharging characteristics and the cycle characteristics of a lithium ion secondary battery, the average of the proportions of the Gaussian functions in the peak 3 and the peak 4 is preferably 93% or more, more preferably 95% or more, and still more preferably 97% or more. In addition, from the same viewpoint, the average of the proportions of the Gaussian functions in the peak 3 and the peak 4 is preferably 99.9% or less and more preferably 99.7% or less.

Coefficient of Determination

In the peak separation of the Raman spectra obtained by the Raman scattering measurement of carbon in the positive electrode material, the coefficient of determination with the measured peak of Raman scattering peak of carbon is preferably 0.998 or more.

The coefficient of determination between the peak of Raman scattering of carbon and the fitting function indicates the thickness of a graphene layer and the amount of particulate carbon. When the graphene layer is a single layer, the peak of Raman scattering becomes a single peak. In the case of five peaks, fitting becomes impossible, and thus the coefficient of determination becomes small. In addition, when the graphene layer becomes thicker than 10 layers, peaks converges to two peaks, and thus the coefficient of determination becomes small even when the graphene layer is too thick. In addition, when the amount of particulate carbon increases, the Raman scattering of graphite is exhibited, and the shape of the peak changes. The coefficient of determination of 0.998 or more indicates that the graphene layer is as thick as two layers to 10 layers and has a thickness suitable for conductivity and the migration of lithium ions and the amount of free carbon is small.

From the viewpoint of further improving the charging and discharging characteristics and the cycle characteristics of the lithium ion secondary battery, the coefficient of determination is more preferably 0.9985 or more, still more preferably 0.9990 or more, and far still more preferably 0.9995 or more.

The coefficient of determination is obtained during peak fitting and is generally calculated with numerical calculation software installed in a Raman spectroscopic measurement instrument (Raman microscope or the like) based on Raman spectroscopic data measured with the instrument.

Full Width at Half Maximum

In the peak separation of the Raman spectra obtained by the Raman scattering measurement of carbon in the positive electrode material, the intensity of the peak top of the peak 4 is the highest, additionally, the full width at half maximum of the peak 3 is preferably 150 $cm^{-1}$ or more and 330 $cm^{-1}$ or less, and the full width at half maximum of the peak 4 is preferably 280 $cm^{-1}$ or more and 360 $cm^{-1}$ or less.

When the intensity of the peak top of the peak 4 is the highest among the peaks 1 to 5, this indicates that the amount of carbon that forms the graphene layer is larger than the amount of particulate carbon and indicates that the ratio of carbon that contributes to the electron conductivity is high.

In addition, when the full width at half maximum of the peak 3 is 150 $cm^{-1}$ or more and 330 $cm^{-1}$ or less, and the full width at half maximum of the peak 4 is 280 $cm^{-1}$ or more and 360 $cm^{-1}$ or less, the carbonization intensity becomes suitable for electron conductivity and the passage of lithium ions in the region.

The full width at half maximum of the peak 3 is more preferably 160 $cm^{-1}$ or more and 325 $cm^{-1}$ or less, still more preferably 170 $cm^{-1}$ or more and 320 $cm^{-1}$ or less, and far still more preferably 180 $cm^{-1}$ or more and less than 315 $cm^{-1}$.

The full width at half maximum of the peak 4 is more preferably 282 $cm^{-1}$ or more and 355 $cm^{-1}$ or less, still more preferably 284 $cm^{-1}$ or more and 350 $cm^{-1}$ or less, and far still more preferably 285 $cm^{-1}$ or more and 345 $cm^{-1}$ or less.

Carbonaceous Coated Active Material

The positive electrode material according to the present embodiment is preferably a carbonaceous coated active material containing carbon having the above-described Raman characteristics. Specifically, it is preferable that the active material includes an olivine-structured primary particle or a granulated body thereof and the active material is coated with a carbonaceous film containing carbon having the above-described Raman characteristics.

Carbon having the above-described Raman characteristics has crystallinity that is not excessively high, is less likely to inhibit the intercalation and deintercalation of lithium ions, and thus has softness that suppresses the peeling of the carbonaceous film from the active material. Therefore, it is considered that, when the positive electrode material contains an active material coated with a carbonaceous film containing carbon having the above-described Raman characteristics, the electron conductivity is high, and it is possible to enhance the charging and discharging characteristics and the cycle characteristics of a lithium ion secondary battery.

Active Material

The active material (positive electrode active material) that the positive electrode material of the present embodiment contains is preferably an olivine-type phosphate-based compound represented by General Formula $Li_xA_yD_zPO_4$.

In the general formula, A represents at least one element selected from the group consisting of Co, Mn, Ni, Fe, Cu, and Cr, D represents at least one element selected from the group consisting of Mg, Ca, Sr, Ba, Ti, Zn, B, Al, Ga, In, Ge, Sc, and Y, and x, y, and z satisfy $0.9<x<1.1$, $0<y\le1.0$, $0\le z\le1.0$, and $0.9<y+z<1.1$.

In the general formula, A and D each may be independently two or more elements, and the general formula may be represented by, for example, a formula such as $Li_xA^1_{y_1}A^2_{y_2}D^1_{z_1}D^2_{z_2}D^3_{z_3}D^4_{z_4}PO_4$. At this time, the sum of $y_1$ and $y_2$ needs to be in the range of y, that is, the range of more than 0 and 1.0 or less, and the sum of $z_1$, $z_2$, $z_3$, and $z_4$ needs to be in the range of z, that is, the range of 0 or more and less than 1.0.

The olivine-type phosphate-based compound is not particularly limited as long as the olivine-type phosphate-based compound has the above-described constitution, but is preferably made of an olivine-structured transition metal lithium phosphate compound.

In General Formula $Li_xA_yD_zPO_4$, A is preferably Co, Mn, Ni, or Fe and more preferably Co, Mn, or Fe. In addition, D is preferably Mg, Ca, Sr, Ba, Ti, Zn, or Al. Containing these elements in the olivine-type phosphate-based compound enables a positive electrode mixture layer to realize a high discharge potential and high safety. In addition, these elements have an abundant amount of resources and are thus preferred as a material to be selected.

The olivine-type phosphate-based compound may also be represented by General Formula $LiFe_{x2}Mn_{1-x2-y2}M_{y2}PO_4$ from the viewpoint of a high discharge capacity and a high energy density.

In General Formula $LiFe_{x2}Mn_{1-x2-y2}M_{y2}PO_4$, M is at least one element selected from Mg, Ca, Co, Sr, Ba, Ti, Zn, B, Al, Ga, In, Si, Ge, Sc and Y, $0.05\le x2\le 1.0$, and $0\le y2\le 0.14$.

The shape of the olivine-type phosphate-based compound of the present embodiment is preferably a primary particle and a granulated body thereof (a secondary particle, which is an aggregate of the primary particles).

The shape of the primary particle of the olivine-type phosphate-based compound is not particularly limited, but is preferably spherical, particularly, truly spherical. When the primary particle has a spherical shape, it is possible to decrease the amount of a solvent used at the time of preparing a paste for forming a positive electrode using the positive electrode material of the present embodiment, and it becomes easy to apply the paste for forming a positive electrode to a current collector. The paste for forming a positive electrode can be prepared by, for example, mixing the positive electrode material of the present embodiment, a binder resin (a binder), and a solvent.

The primary particle of the olivine-type phosphate-based compound and the granulated body of the primary particle will be collectively referred to as the active material particle.

Carbonaceous Film

Carbon that the positive electrode material of the present embodiment contains and has the above-described Raman characteristics is preferably contained in the positive electrode material as a carbonaceous film that coats the active material particles.

The carbonaceous film is a pyrolytic carbonaceous film that is obtained by carbonizing an organic substance that serves as a raw material of the carbonaceous film.

The organic substance is not particularly limited as long as the organic substance is capable of forming the carbonaceous film on the surfaces of the active material particles, and examples of the organic substance include polyvinyl alcohol (PVA), polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonate, polyacrylamide, polyvinyl acetate, phenol, phenolic resins, glucose, fructose, galactose, mannose, maltose, sucrose, lactose, glycogen, pectin, alginic acid, glucomannan, chitin, hyaluronic acid, chondroitin, agarose, polyether, polyvalent alcohol, and the like. Examples of the polyvalent alcohol include polyethylene glycol, polypropylene glycol, polyglycerin, glycerin, and the like. These solvents may be used singly or two or more solvents may be mixed and used.

Amount of Carbon

In the positive electrode material in the present embodiment, the amount of carbon is preferably 0.5% by mass or more and 7% by mass or less. In a case where the positive electrode material is made of carbonaceous coated active material particles, the amount of carbon in the positive electrode material is obtained as the mass of the carbonaceous film with respect to the total mass of the carbonaceous film and the active material particles.

When the amount of carbon is 0.5% by mass or more, the discharge capacity of the lithium ion secondary battery at a high charge-discharge rate increases, and it is possible to realize a sufficient charge and discharge rate performance. When the amount of carbon is 7% by mass or less, it is possible to suppress the battery capacity of the lithium ion secondary battery per unit mass of the positive electrode material being decreased more than necessary.

From the viewpoint of improving the charging and discharging characteristics and the cycle characteristics of the lithium ion secondary battery, the amount of carbon in the positive electrode material is more preferably 0.6% by mass or more and 6.0% by mass or less, further preferably 0.7% by mass or more and 4.5% by mass or less, and still more preferably 0.8% by mass or more and 3.0% by mass or less.

The amount of carbon can be measured using a carbon analyzer (for example, manufactured by Horiba, Ltd., model number: EMIA-220V).

Crystallite Diameter

In the positive electrode material in the present embodiment (preferably the carbonaceous coated active material particles), the crystallite diameter analyzed by X-ray diffraction is preferably 50 nm or more and 250 nm or less.

When the crystallite diameter of the positive electrode material is 50 nm or more, an increase in the amount of carbon necessary to sufficiently coat the surfaces of the active material particles, which are the central particles, with the carbonaceous film is suppressed, and it is possible to suppress an increase in the amount of a binder that is used to form the carbonaceous film. Therefore, it is possible to increase the amount of the active material in the positive electrode and to increase the capacity of the battery. In addition, it is possible to suppress the occurrence of the peeling of the carbonaceous film from the active material particles due to the lack of a binding force.

When the crystallite diameter of the positive electrode material is 250 nm or less, the internal resistance of the active material is suppressed, and, in a case where a battery has been formed, it is possible to increase the discharge capacity at a high charge-discharge rate.

The crystallite diameter of the positive electrode material is more preferably 50 nm or more and 220 nm or less, still more preferably 60 nm or more and 170 nm or less, far still more preferably 60 nm or more and 140 nm or less, and far still more preferably 70 nm or more and 117 nm or less.

The crystallite diameter of the positive electrode material is measured with an X-ray diffractometer (for example, RINT2000, manufactured by Rigaku Corporation) and can be calculated from the Scherrer's formula using the full width at half maximum and the diffraction angle (2θ) of the diffraction peak of a (020) plane of the obtained powder X-ray diffraction pattern.

Specific Surface Area

The specific surface area of the positive electrode material (preferably the carbonaceous coated active material particles) is preferably 5 to 25 $m^2/g$.

When the specific surface area of the positive electrode material is 5 $m^2/g$ or more, it is possible to increase the diffusion rate of lithium ions in the particles by suppressing the coarsening of the positive electrode material. Therefore, it is possible to improve the battery characteristics of the lithium ion secondary battery.

When the specific surface area of the positive electrode material is 25 $m^2/g$ or less, the positive electrode density in the positive electrode containing the positive electrode material can be increased, and thus it is possible to provide a lithium ion secondary battery having a high energy density.

The specific surface area can be measured by a BET method through nitrogen ($N_2$) adsorption using a specific surface area meter (for example, manufactured by Microtrac BEL Corp., trade name: BELSORP-mini).

Average Particle Diameter of Primary Particles

The average particle diameter of the primary particles of the active material particles coated with the carbonaceous film (carbonaceous coated active material particles) is preferably 50 nm or more, more preferably 70 nm or more, and still more preferably 100 nm or more. The average particle diameter is preferably 500 nm or less, more preferably 450 nm or less, and still more preferably 400 nm or less. When the average particle diameter of the primary particles is 50 nm or more, it is possible to suppress an increase in the amount of carbon attributed to an increase in the specific surface area of the positive electrode material, and thus it is possible to suppress a decrease in the charge and discharge capacity of the lithium ion secondary battery. When the average particle diameter of the primary particles is 500 nm or less, it is possible to shorten the migration time of lithium ions or the migration time of electrons, which migrate in the positive electrode material. Therefore, it is possible to suppress the deterioration of the output characteristics attributed to an increase in the internal resistance of the lithium ion secondary battery.

Here, the average particle diameter of the primary particles refers to the number-average particle diameter. The average particle diameter of the primary particles can be obtained by number-averaging the particle diameters of 200 or more particles measured by scanning electron microscopic (SEM) observation.

Average Particle Diameter of Secondary Particles

The average particle diameter of the secondary particles of the carbonaceous coated active material particles is preferably 0.5 μm or more, more preferably 1.0 μm or more, and still more preferably 1.5 μm or more. In addition, the average particle diameter of the secondary particles of the carbonaceous coated positive electrode active material particles is preferably 20 μm or less, more preferably 18 μm or less, and still more preferably 15 μm or less. When the average particle diameter of the secondary particles is 0.5 μm or more, it is possible to suppress the necessity of a large amount of a conductive auxiliary agent and a binder at the time of preparing a positive electrode material paste for a lithium ion secondary battery by mixing the positive electrode material, the conductive auxiliary agent, a binder resin (the binder), and a solvent. Therefore, it is possible to increase the battery capacity of the lithium ion secondary battery per unit mass in the positive electrode mixture layer of the positive electrode of the lithium ion secondary battery. When the average particle diameter of the secondary particles is 20 μm or less, it is possible to enhance the dispersibility and uniformity of the conductive auxiliary agent or the binder in the positive electrode mixture layer of the positive electrode of the lithium ion secondary battery. As a result, the discharge capacity at the high-speed charge and discharge of the lithium ion secondary battery increases.

Here, the average particle diameter of the secondary particles refers to the volume-average particle diameter. The average particle diameter of the secondary particles can be measured using a laser diffraction and scattering particle size distribution measurement instrument or the like.

Thickness of Carbonaceous Film

The thickness (average value) of the carbonaceous film that coats the active material particles is preferably 1.0 nm or more and more preferably 1.4 nm or more. In addition, the thickness of the carbonaceous film is preferably 10.0 nm or less and more preferably 7.0 nm or less. When the thickness of the carbonaceous film is 1.0 nm or more, it is possible to suppress an increase in the sum of the migration resistances of electrons in the carbonaceous film. Therefore, it is possible to suppress an increase in the internal resistance of the lithium ion secondary battery and to prevent voltage drop at a high charge-discharge rate. When the thickness of the carbonaceous film is 10.0 nm or less, it is possible to suppress the formation of a steric barrier that inhibits the diffusion of lithium ions in the carbonaceous film, which decreases the migration resistance of lithium ions. As a result, an increase in the internal resistance of the battery is suppressed, and it is possible to prevent voltage drop at a high charge-discharge rate.

Coating Ratio of Carbonaceous Film

The coating ratio of the carbonaceous film to the active material particles is preferably 60% or more and more preferably 80% or more. When the coating ratio of the carbonaceous film is 60% or more, the coating effect of the carbonaceous film can be sufficiently obtained.

The coating ratio of the carbonaceous film can be obtained by observing the particles using a transmission electron microscope (TEM), an energy dispersive X-ray microanalyzer (EDX), or the like, calculating the proportions of parts that cover the particle surfaces, and obtaining the average value thereof.

Density of Carbonaceous Film

The density of the carbonaceous film, which is calculated using a carbon component constituting the carbonaceous film, is preferably 0.3 $g/cm^3$ or more and more preferably 0.4 $g/cm^3$ or more. In addition, the density of the carbonaceous film is preferably 2.0 $g/cm^3$ or less and more preferably 1.8 $g/cm^3$ or less. The density of the carbonaceous film, which is calculated using the carbon component constituting the carbonaceous film, refers to the mass of the carbonaceous film per unit volume in a case where the carbonaceous film is formed of carbon alone.

When the density of the carbonaceous film is 0.3 $g/cm^3$ or more, the carbonaceous film is capable of exhibiting a sufficient electron conductivity. When the density of the carbonaceous film is 2.0 $g/cm^3$ or less, since the amount of the fine crystals of graphite having a lamellar structure in the carbonaceous film is small, the fine crystals of graphite do not generate any steric barrier during the diffusion of lithium ions in the carbonaceous film. Therefore, the lithium ion migration resistance does not increase. As a result, there is no case where the internal resistance of the lithium ion secondary battery increases, and the voltage of the lithium ion secondary battery at a high charge-discharge rate does not drop.

Method for Manufacturing Positive Electrode Material for Lithium Ion Secondary Battery The method for manufacturing the positive electrode material for a lithium ion secondary battery of the present embodiment is not particularly limited as long as it is possible to make the positive electrode material include carbon having the above-described Raman characteristics in the method.

The method for manufacturing the positive electrode material has, for example, (A) a step of obtaining the active material particles, (B) a step of preparing a mixture by adding an organic compound to the active material particles obtained in the step (A), and (C) a step of putting the mixture into a calcination capsule and calcinating the mixture.

Carbon having the above-described Raman characteristics is easily manufactured by adjusting the amount of the organic compound added in the step (B); the calcination conditions of the mixture in the step (C); and the like. The detail will be described below.

Step (A)

The active material particles can be manufactured using, for example, a conventional method such as a solid phase method, a liquid phase method, a gas phase method, or the like. Examples of $Li_xA_yD_zPO_4$ obtained using the above-described method include particle-like $Li_xA_yD_zPO_4$ (hereinafter, referred to as "$Li_xA_yD_zPO_4$ particles" in some cases).

The $Li_xA_yD_zPO_4$ particles can be obtained by, for example, hydrothermally synthesizing a slurry-form mixture that is obtained by mixing a Li source, an A source, a P source, water, and, as necessary, a D source. According to the hydrothermal synthesis, $Li_xA_yD_zPO_4$ is generated as a precipitate in water. The obtained precipitate may be the precursor of $Li_xA_yD_zPO_4$. In this case, the precursor of $Li_xA_yD_zPO_4$ is calcinated to obtain the target $Li_xA_yD_zPO_4$ particles.

A pressure-resistant airtight container is preferably used in the hydrothermal synthesis.

As the reaction conditions of the hydrothermal synthesis, for example, the heating temperature is preferably 110° C. or higher and 200° C. or lower, more preferably 115° C. or higher and 195° C. or lower, and still more preferably 120° C. or higher and 190° C. or lower. When the heating temperature is set in the above-described range, it is possible to set the specific surface area of the active material particles in the above-described range.

In addition, the reaction time is preferably 30 minutes or longer and 120 hours or shorter, more preferably one hour or longer and 24 hours or shorter, and still more preferably five hours or longer and 15 hours or shorter.

Furthermore, the pressure during the reaction is preferably 0.1 MPa or higher and 22 MPa or lower and more preferably 0.1 MPa or higher and 17 MPa or lower.

The molar ratio (Li:A:D:P) among the Li source, the A source, the D source, and the P source is preferably 2.5 to 4.0:0 to 1.0:0 to 1.0:0.9 to 1.15 and more preferably 2.8 to 3.5:0 to 1.0:0 to 1.0:0.95 to 1.1.

Here, as the Li source, for example, at least one element selected from the group consisting of hydroxides such as lithium hydroxide (LiOH) and the like; inorganic lithium acid salts such as lithium carbonate ($Li_2CO_3$), lithium chloride (LiCl), lithium nitrate ($LiNO_3$), lithium phosphate ($Li_3PO_4$), lithium hydrogen phosphate ($Li_2HPO_4$), lithium dihydrogen phosphate ($LiH_2PO_4$), and the like; organic lithium acid salts such as lithium acetate ($LiCH_3COO$), lithium oxalate (($COOLi)_2$), and the like, and hydrates thereof is preferably used.

Lithium phosphate ($Li_3PO_4$) can be used as both the Li source and the P source.

Examples of the A source include chlorides, carboxylates, hydrosulfates, and the like that include at least one element selected from the group consisting of Co, Mn, Ni, Fe, Cu, and Cr. For example, in a case where A in $Li_{x1}A_{y1}D_{z1}PO_4$ is Fe, examples of the Fe source include iron compounds such as iron (II) chloride ($FeCl_2$), iron(II) sulfate ($FeSO_4$), iron (II) acetate ($Fe(CH_3COO)_2$), and the like and hydrates thereof, trivalent iron compounds such as iron (III) nitrate ($Fe(NO_3)_3$), iron(III) chloride ($FeCl_3$), iron (III) citrate ($FeC_6H_5O_7$), and the like, lithium iron phosphate, and the like.

Examples of the D source include chlorides, carboxylates, hydrosulfates, and the like which include at least one element selected from the group consisting of Mg, Ca, Sr, Ba, Ti, Zn, B, Al, Ga, In, Si, Ge, Sc, and Y. For example, in a case where D in $Li_{x1}A_{y1}D_{z1}PO_4$ is Ca, examples of the Ca source include calcium (II) hydroxide ($Ca(OH)_2$), calcium (II) chloride ($CaCl_2$), calcium (II) sulfate ($CaSO_4$), calcium (II) nitrate ($Ca(NO_3)_2$), calcium (II) acetate ($Ca(CH_3COO)_2$), hydrates thereof, and the like.

Examples of the P source include phosphoric acid compounds such as phosphoric acid ($H_3PO_4$), ammonium dihydrogen phosphate ($NH_4H_2PO_4$), diammonium phosphate (($NH_4)_2HPO_4$), and the like. Among these, as the P source, at least one element selected from the group consisting of phosphoric acid, ammonium dihydrogen phosphate, and diammonium phosphate is preferably used.

Step (B)

In the step (B), an organic compound is added to the active material particles obtained in the step (A) to prepare a mixture.

First, the organic compound is added to the active material particles, and then a solvent is added thereto.

The amount of the organic compound blended into the active material particles is preferably 0.15 parts by mass or more and 15 parts by mass or less and more preferably 0.45 parts by mass or more and 4.5 parts by mass or less with respect to 100 parts by mass of the active material particles when the total mass of the organic compound is converted to a carbon element.

When the amount of the organic compound blended into the active material particles is 0.15 parts by mass or more, it is possible to set the coating ratio of the carbonaceous film that is generated by a heat treatment of the organic compound to the surfaces of the active material particles to 80% or more. Therefore, it is possible to improve the charging and discharging characteristic and the cycle characteristic of the lithium ion secondary battery. When the amount of the organic compound blended into the active material particles is 15 parts by mass or less, it is possible to suppress a decrease in the capacity of the lithium ion secondary battery caused by a relative decrease in the blending ratio of the active material particles. In addition, when the amount of the organic compound blended into the active material particles is 15 parts by mass or less, it is possible to suppress an increase in the bulk density of the active material particles caused by the excessive support of the carbonaceous film by the active material particles. When an increase in the bulk density of the active material particles is suppressed, it is possible to suppress a decrease in the electrode density and a decrease in the capacity of the lithium ion secondary battery per unit volume.

As the organic compound that is used to prepare the mixture, the above-described compounds can be used.

Here, when a low-molecular-weight organic compound such as sucrose, lactose, or the like is used as the organic compound, it becomes easy to uniformly form the carbonaceous film on the surfaces of the primary particles of the positive electrode material, but there is a tendency that the degree of carbonization of the carbonaceous film that is obtained by pyrolysis decreases, and it is difficult to form a carbonaceous film capable of sufficiently decreasing the resistance. In addition, the use of the above-described low-molecular-weight organic compound increases the amount of micropores in the carbonaceous film and increases the ratio of the micropores to all pores. On the other hand, when a high-molecular-weight organic compound such as polyvinyl alcohol, polyvinyl pyrrolidone, or the like or an organic compound having a benzene ring structure such as a phenolic resin or the like is used, there is a tendency that the degree of carbonization of the carbonaceous film that is obtained by pyrolysis increases, and a sufficient decrease in resistance can be achieved. However, there is a tendency that it becomes difficult to uniformly form the carbonaceous film on the surfaces of the primary particles of the positive electrode material, and there is a problem in that it is difficult to sufficiently decrease the resistance of the positive electrode material or the like. In addition, the use of the high-molecular-weight organic compound or the organic compound having a benzene ring structure decreases the amount of micropores in the carbonaceous film and decreases the ratio of the micropores to all pores.

Therefore, it is preferable to use an appropriate mixture of the low-molecular-weight organic compound and the high-molecular-weight organic compound or the organic compound having a benzene ring structure.

Particularly, the low-molecular-weight organic compound is preferably used in a powder form since it is easy to mix the active material particles and the organic compound, and it is possible to obtain a positive electrode material in which the carbonaceous film is uniformly formed on the surfaces of the primary particles of the active material particles. In addition, unlike the high-molecular-weight organic compound, the low-molecular-weight organic compound easily dissolves in a solution and does not require any prior dissolution operation or the like, and thus it is possible to decrease the number of operation steps, reduce costs for the dissolution operation, or the like.

When the solvent is added to the active material particles, an adjustment is carried out such that the solid content of the solvent preferably reaches 10% to 60% by mass, more preferably reaches 15% to 55% by mass, and still more preferably reaches 25% to 50% by mass. When the solid content is set in the above-described range, it is possible to set the tap density of a positive electrode material to be obtained in the above-described range.

Examples of the solvent include water; alcohols such as methanol, ethanol, 1-propanol, 2-propanol (isopropyl alcohol: IPA), butanol, pentanol, hexanol, octanol, diacetone alcohol, and the like; esters such as ethyl acetate, butyl acetate, ethyl lactate, propylene glycol monomethyl ether acetate, propylene glycol monoethyl ether acetate, γ-butyrolactone, and the like; ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, diethylene glycol monoethyl ether, and the like; ketones such as acetone, methyl ethyl ketone (MEK), methyl isobutyl ketone (MIBK), acetyl acetone, cyclohexanone, and the like; amides such as dimethyl formamide, N,N-dimethylacetoacetamide, N-methyl pyrrolidone, and the like; glycols such as ethylene glycol, diethylene glycol, propylene glycol, and the like, and the like. These solvents may be used singly or two or more solvents may be mixed and used. Among these solvents, a preferred solvent is water.

A dispersant may be added thereto as necessary.

The method for dispersing the active material particles and the organic compound in the solvent is not particularly limited as long as the active material particles uniformly disperse and the organic compound dissolves or disperses. Examples of a device that is used for the above-described dispersion include medium stirring-type dispersion devices that stir medium particles at a high rate such as a planetary ball mill, an oscillation ball mill, a bead mill, a paint shaker, an attritor, and the like.

The granulated body of the mixture may be generated by spraying and drying the mixture in a high-temperature atmosphere, for example, the atmosphere at 110° C. or higher and 200° C. or lower using a spray-pyrolysis method.

In the spray-pyrolysis method, in order to generate a substantially spherical granulated body by rapidly drying the mixture, the particle diameter of a liquid droplet during the spraying is preferably 0.01 μm or more and 100 μm or less.

Step (C)

In the step (C), the mixture obtained in the step (B) is put into a calcination capsule and is calcinated.

In the calcination of the mixture, it is preferable that (1) the mixture is heated to manufacture granulated powder (granulation step), and then (2) the heating temperature is rapidly increased to control the calcination time (rapid temperature increase step). When the mixture is calcinated by the above-described steps, it is possible to accelerate the reaction for the formation of graphene in the interfaces between the active material particles and a carbon source, and it is easy to manufacture active material particles coated with a carbonaceous film containing poorly crystalline graphene. A carbonaceous coated active material manufactured as described above maintains appropriate electron conductivity and appropriate lithium ion transmittance, carbon is highly flexible, and it is possible to improve the charging and discharging characteristics and the cycle characteristics of lithium ion secondary batteries.

As the calcination capsule, for example, a calcination capsule made of a substance having excellent thermal conductivity such as carbon or the like is preferably used.

(1) Granulation Step

In the granulation step, the mixture is heated to manufacture granulated powder.

For example, the mixture may be dried and granulated using a spray dryer at a temperature at which the drying outlet temperature reaches 40° C. to 80° C. The heating temperature in the granulation step is preferably 50° C. to 70° C.

(2) Rapid Temperature Increase Step

In the rapid temperature increase step, the heating temperature of the granulated powder obtained in the granulation step is rapidly increased to control the calcination time. In order to accelerate the reaction for the formation of graphene in the interfaces between the active material particles and the carbon source, it is preferable that the temperature of the granulated powder is rapidly increased up to the carbonization temperature range and the granulated powder is held at that temperature for a specific time.

The rapid temperature increase step is preferably repeated twice or more.

In a case where the rapid temperature increase step is repeated, for example, twice, in the first rapid temperature increase step, it is preferable that the heating temperature of the granulated powder is increased up to 200° C. or higher and 450° C. or lower at a temperature increase rate of 3° C./minute or higher and 15° C./minute or lower and the granulated powder is calcinated by holding the heating temperature for a time of 10 minutes or longer and 120 minutes or shorter.

The temperature increase rate in the first rapid temperature increase step is more preferably 3° C./minute or higher and 13° C./minute or lower and still more preferably 4° C./minute or higher and 9° C./minute or lower.

The temperature after the first rapid temperature increase step is more preferably 230° C. or higher and 420° C. or lower and still more preferably 250° C. or higher and 380° C. or lower.

The calcination time in the first rapid temperature increase step is more preferably 10 minutes or longer and 80 minutes or shorter and still more preferably 20 minutes or longer and 50 minutes or shorter.

In the second rapid temperature increase step, it is preferable that the heating temperature of the granulated powder is increased up to 630° C. or higher and 770° C. or lower at a temperature increase rate of 10° C./minute or higher and 25° C./minute or lower and the granulated powder is calcinated by holding the heating temperature for a time of 10 minutes or longer and 120 minutes or shorter.

The temperature increase rate in the second rapid temperature increase step is more preferably 12° C./minute or higher and 22° C./minute or lower and still more preferably 13° C./minute or higher and 18° C./minute or lower.

The temperature after the second temperature increase is more preferably 650° C. or higher and 750° C. or lower and still more preferably 650° C. or higher and 740° C. or lower.

The calcination time in the second rapid temperature increase step is more preferably 10 minutes or longer and 70 minutes or shorter and still more preferably 25 minutes or longer and 50 minutes or shorter.

The highest calcination temperature is preferably 630° C. or higher and 770° C. or lower.

When the highest calcination temperature is 630° C. or higher, the decomposition and reaction of the organic compound sufficiently proceed, and it is possible to sufficiently carbonize the organic compound. As a result, it is possible to form a low-resistance carbonaceous film on the obtained positive electrode material. When the highest calcination temperature is 770° C. or lower, grain growth in the positive electrode material does not proceed, and it is possible to maintain a sufficiently large specific surface area. As a result, the discharge capacity at a high charge-discharge rate increases in a case where a lithium ion secondary battery is formed, and it is possible to realize sufficient charge and discharge rate performance.

The highest calcination temperature is more preferably 680° C. or higher and 770° C. or lower.

In a case where the rapid temperature increase step is repeated twice or more, the total calcination time needs to be long enough to sufficiently carbonize the organic compound, is not particularly limited, and is, for example, 0.2 hours or longer and 100 hours or shorter.

The calcination atmosphere is preferably an inert atmosphere filled with an inert gas such as nitrogen ($N_2$), argon (Ar), or the like or a reducing atmosphere including a reducing gas such as hydrogen ($H_2$) or the like. In addition, a superheated steam atmosphere may also be used to accelerate the carbonization reaction. In a case where it is necessary to further suppress the oxidation of the mixture, the calcination atmosphere is more preferably a reducing atmosphere.

The calcination in the step (C) causes the decomposition and reaction of the organic compound, thereby generating carbon. In addition, this carbon is attached to the surfaces of the active material particles and turned into the carbonaceous film. Therefore, the surfaces of the active material particles are covered with the carbonaceous film.

In the present embodiment, in the step (C), it is also possible to add a thermal conduction auxiliary substance having a higher thermal conductivity than the active material particles to the mixture and then calcinate the mixture. In such a case, it is possible to make the temperature distribution in the calcination capsule during calcination more uniform. As a result, it is possible to suppress the generation of a portion in which the organic compound is not sufficiently carbonized due to temperature unevenness in the calcination capsule or the generation of a portion in which the active material particles are reduced by carbon.

The thermal conduction auxiliary substance is not particularly limited as long as the thermal conduction auxiliary substance has a higher thermal conductivity than the active material particles, but is preferably a substance that does not easily react with the active material particles. This is because, when the thermal conduction auxiliary substance reacts with the active material particles, there is a concern that the battery activity of active material particles to be obtained after the calcination may be impaired or there is a concern that it may become impossible to collect and reuse the thermal conduction auxiliary substance after the calcination.

Examples of the thermal conduction auxiliary substance include carbonaceous materials, alumina-based ceramic, magnesia-based ceramic, zirconia-based ceramic, silica-based ceramic, calcia-based ceramic, aluminum nitride, and the like. These thermal conduction auxiliary substances may be used singly or two or more thermal conduction auxiliary substances may be mixed and used.

The thermal conduction auxiliary substance is preferably a carbonaceous material, and examples of the carbonaceous material include graphite, acetylene black (AB), vapor-grown carbon fiber (VGCF), carbon nanotube (CNT), graphene, and the like. These thermal conduction auxiliary substances may be used singly or two or more carbonaceous materials may be mixed and used. Among these carbonaceous materials, graphite is more preferred as the thermal conduction auxiliary substance.

The dimensions of the thermal conduction auxiliary substance are not particularly limited. However, from the viewpoint of the thermal conduction efficiency, due to the capability of making the temperature distribution in the calcination capsule sufficiently uniform and the purpose of decreasing the amount of the thermal conduction auxiliary substance added, the average length of the thermal conduction auxiliary substance in the longitudinal direction is preferably 1 mm or more and 100 mm or less and more preferably 5 mm or more and 30 mm or less. In addition, when the average length of the thermal conduction auxiliary substance in the longitudinal direction is 1 mm or more and 100 mm or less, it becomes easy to separate the thermal conduction auxiliary substance from the positive electrode material using a sieve.

In addition, the thermal conduction auxiliary substance preferably has a greater specific weight than the positive electrode material since the thermal conduction auxiliary substance is easily separated using an air flow-type classifier or the like.

The amount of the thermal conduction auxiliary substance added is also affected by the dimensions of the thermal conduction auxiliary substance. In a case where the content of the mixture is set to 100% by volume, the amount of the thermal conduction auxiliary substance added is preferably 1% by volume or more and 50% by volume or less and more preferably 5% by volume or more and 30% by volume or less. When the amount of the thermal conduction auxiliary substance added is 1% by volume or more, it is possible to make the temperature distribution in the calcination capsule sufficiently uniform. When the amount of the thermal conduction auxiliary substance added is 50% by volume or less, it is possible to suppress a decrease in the amount of the active material particles and the organic compound, which are calcinated in the calcination capsule.

After the calcination, it is preferable to pass the mixture of the thermal conduction auxiliary substance and the positive electrode material through a sieve or the like and to separate the thermal conduction auxiliary substance and the positive electrode material from each other.

Positive Electrode for Lithium Ion Secondary Battery

A positive electrode for a lithium ion secondary battery of the present embodiment is a positive electrode for a lithium ion secondary battery including an electrode current collector and a positive electrode mixture layer formed on the electrode current collector. The positive electrode mixture layer contains the positive electrode material of the present embodiment.

Since the positive electrode for a lithium ion secondary battery of the present embodiment contains the positive electrode material for a lithium ion secondary battery of the present embodiment, a lithium ion secondary battery for which the positive electrode for a lithium ion secondary battery of the present embodiment is used is excellent in terms of the charging and discharging characteristics and the cycle characteristics.

Hereinafter, the positive electrode for a lithium ion secondary battery will be simply referred to as "positive electrode" in some cases.

In order to produce the positive electrode, the positive electrode material, a binder made of a binder resin, and a solvent are mixed together, thereby preparing a coating material for forming the positive electrode or a paste for forming the positive electrode. At this time, a conductive auxiliary agent such as carbon black, acetylene black, graphite, ketjen black, natural graphite, artificial graphite, or the like may be added thereto as necessary.

As the binder, that is, the binder resin, for example, a polytetrafluoroethylene (PTFE) resin, a polyvinylidene fluoride (PVdF) resin, fluorine rubber, or the like is preferably used.

The blending ratio between the positive electrode material and the binder resin is not particularly limited. However, for example, the content of the binder resin is set to 1 part by mass to 30 parts by mass and preferably set to 3 parts by mass to 20 parts by mass with respect to 100 parts by mass of the positive electrode material.

The solvent that is used for the coating material for forming the positive electrode or the paste for forming the positive electrode may be appropriately selected in accordance with properties of the binder resin.

Examples of the solvent include water; alcohols such as methanol, ethanol, 1-propanol, 2-propanol (isopropyl alcohol: IPA), butanol, pentanol, hexanol, octanol, diacetone alcohol, and the like; esters such as ethyl acetate, butyl acetate, ethyl lactate, propylene glycol monomethyl ether acetate, propylene glycol monoethyl ether acetate, γ-butyrolactone, and the like, ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, diethylene glycol monoethyl ether, and the like, ketones such as acetone, methyl ethyl ketone (MEK), methyl isobutyl ketone (MIBK), acetylacetone, cyclohexanone, and the like, amides such as dimethyl formamide, N,N-dimethylacetoacetamide, N-methylpyrrolidone, and the like, glycols such as ethylene glycol, diethylene glycol, propylene glycol, and the like, and the like. These solvents may be used singly or two or more solvents may be mixed and used.

Next, the coating material for forming the positive electrode or the paste for forming the positive electrode is applied to one main surface of the electrode current collector to form a coated film. Next, this coated film is dried to obtain an electrode current collector having the coated film formed on one main surface. The coated film is made of the mixture containing the positive electrode material and the binder. After that, the coated film is pressurized, bonded by pressure, and dried to produce a positive electrode having a positive electrode mixture layer on one main surface of the electrode current collector.

More specifically, for example, the coating material for forming the positive electrode or the paste for forming the positive electrode is applied to one surface of an aluminum foil. Next, the coated film is dried to obtain an aluminum foil having the coated film formed on one surface. The coated film is made of the mixture containing the positive electrode material and the binder. Next, the coated film is pressurized, bonded by pressure, and dried, thereby producing a current collector (positive electrode) having a positive electrode mixture layer on one surface of the aluminum foil.

A positive electrode with which a lithium ion secondary battery having excellent high input characteristics and excellent cycle characteristics can be obtained can be produced in the above-described manner.

Lithium Ion Secondary Battery

A lithium ion secondary battery of the present embodiment is a lithium ion secondary battery having a positive electrode, a negative electrode, and a non-aqueous electrolyte. The lithium ion secondary battery includes the positive electrode for a lithium ion secondary battery of the present embodiment as the positive electrode.

The lithium ion secondary battery of the present embodiment is not limited to the above-described constitution and may further include, for example, a separator.

Negative Electrode

Examples of the negative electrode include negative electrodes including a negative electrode material such as metallic Li, a carbon material such as natural graphite, hard carbon, or the like, a Li alloy, $Li_4Ti_5O_{12}$, $Si(Li_{4.4}Si)$, or the like.

Non-Aqueous Electrolyte

Examples of the non-aqueous electrolyte include electrolytes obtained by mixing ethylene carbonate (EC) and ethyl methyl carbonate (EMC) such that the volume ratio reaches 1:1 and dissolving lithium hexafluorophosphate ($LiPF_6$) in the obtained solvent mixture such that the concentration reaches 1 mol/dm$^3$.

Separator

The positive electrode of the present embodiment and the negative electrode can be made to face each other through a separator. As the separator, it is possible to use, for example, porous propylene.

In addition, instead of the non-aqueous electrolyte and the separator, a solid electrolyte may be used.

In the lithium ion secondary battery of the present embodiment, since the positive electrode has the positive electrode mixture layer containing the positive electrode material for a lithium ion secondary battery of the present embodiment, Li ion migration is excellent in the periphery of any battery constituent member, and the high input characteristics and the cycle characteristics are excellent. Therefore, the lithium ion secondary battery is preferably used in batteries for driving electric vehicles, batteries for driving hybrid vehicles, and the like.

EXAMPLES

Hereinafter, the present invention will be specifically described using examples and comparative examples. It should be noted that the present invention is not limited to forms described in the examples.

Manufacture of Positive Electrode Material for Lithium Ion Secondary Battery

Example 1

1. Manufacturing of Active Material

LiOH was used as a Li source, $NH_4H_2PO_4$ was used as a P source, and $FeSO_4 \cdot 7H_2O$ was used as a Fe source. These were mixed into pure water such that the ratio of the amounts of the materials (Li:Fe:P) reached 3:1:1, thereby preparing 200 ml of a homogeneous slurry-form mixture.

Next, this mixture was put into a pressure-resistant airtight container having a volume of 500 mL and was hydrothermally synthesized at 170° C. for 12 hours. After this reaction, the inside of the container was cooled to room temperature (25° C.), thereby obtaining a reaction product in a precipitated cake state. This precipitate was sufficiently washed with distilled water a plurality of times, and the water content was maintained at 30% to prevent the precipitate from being dried, thereby producing a cake-like substance.

As a result of measurement by X-ray diffraction of powder obtained by collecting a small amount of the obtained cake-like substance and drying the cake-like substance in a vacuum at 70° C. for 2 hours, it was confirmed that single-phase $LiFePO_4$ was formed.

2. Manufacturing of Mixture 20 g of the obtained $LiFePO_4$ (active material) and 0.73 g of sucrose as a carbon source were mixed into water such that the total amount reached 100 g, and bead milling was carried out together with 150 g of zirconia beads having a diameter of 0.1 mm, thereby obtaining a slurry (mixture) in which the dispersed particle diameter (d50) reached 100 nm.

3. Calcination of Mixture

Granulation Step

The mixture was dried and granulated using a spray dryer at a temperature at which the drying outlet temperature reached 60° C.

Rapid Temperature Increase Step

The heating temperature of granulated powder was increased up to 300° C. at a temperature increase rate of 5° C./minute using a tubular furnace, and then the granulated powder was heated by holding the heating temperature for 30 minutes (first rapid temperature increase step). After that, the heating temperature was increased up to 700° C. at a temperature increase rate of 15° C./minute, and the granulated powder was heated by holding the heating temperature for 30 minutes (second rapid temperature increase step), thereby obtaining a positive electrode material of Example 1 made of a carbonaceous coated active material.

Example 2

A positive electrode material of Example 2 made of a carbonaceous coated active material was obtained in the same manner as in Example 1 except that, in the rapid temperature increase step of Example 1, the highest calcination temperature in the tubular furnace (the calcination temperature in the second rapid temperature increase step) was set to 680° C.

Example 3

A positive electrode material of Example 3 made of a carbonaceous coated active material was obtained in the same manner as in Example 1 except that, in the rapid temperature increase step of Example 1, the calcination conditions in the tubular furnace were changed as described below.

The heating temperature of the granulated powder was increased up to 300° C. at a temperature increase rate of 10° C./minute and then held for 60 minutes. After that, the heating temperature was increased up to 750° C. at a temperature increase rate of 15° C./minute and held for 20 minutes.

Example 4

A mixture was obtained in the same manner as in Example 1 except that, in the manufacturing of the mixture of Example 1, the amount of sucrose was changed to 0.3 g.

Furthermore, a positive electrode material of Example 4 made of a carbonaceous coated active material was obtained in the same manner as in Example 3 except that, in Example 3, the above-described mixture was used instead of the mixture used in Example 3, and, after the granulation and drying of the mixture in the granulation step, 2 g of polyvinyl alcohol powder was injected into the granulated powder and kneaded.

Comparative Example 1

A positive electrode material of Comparative Example 1 made of a carbonaceous coated active material was obtained in the same manner as in Example 4 except that, in the manufacturing of the positive electrode material of Example 4, the amount of the polyvinyl alcohol powder injected was set to 3 g.

Comparative Example 2

A positive electrode material of Comparative Example 2 made of a carbonaceous coated active material was obtained in the same manner as in Comparative Example 1 except that, in the rapid temperature increase step of Comparative Example 1, the highest calcination temperature in the tubular furnace (the calcination temperature in the second rapid temperature increase step) was set to 680° C.

Comparative Example 3

A positive electrode material of Comparative Example 3 made of a carbonaceous coated active material was obtained in the same manner as in Example 1 except that, in the rapid temperature increase step of Example 1, the calcination conditions in the tubular furnace were changed as described below.

The heating temperature of the granulated powder was increased up to 750° C. at a temperature increase rate of 10° C./minute and held for 120 minutes.

Production of Lithium Ion Secondary Batteries

The positive electrode material obtained in each of the examples and comparative examples, acetylene black (AB) as a conductive auxiliary agent, and polyvinylidene fluoride (PVdF) as a binder were mixed into N-methyl-2-pyrrolidinone (NMP) in a weight ratio of a positive electrode material:AB:PVdF=90:5:5 to produce a positive electrode material paste. The obtained paste was applied onto a 30 μm-thick aluminum foil, dried, and then bonded by pressure to a predetermined density, thereby producing an electrode plate.

The obtained electrode plate was blanked into a plate shape having a 3×3 cm$^2$ (coated surface) plus a tab margin, and the tab was welded to produce a test electrode.

Meanwhile, as a counter electrode, a coated electrode that was similarly coated with natural graphite was used. A porous polypropylene film was employed as a separator. In addition, 1 mol/L of a lithium hexafluorophosphate (LiPF$_6$) solution was used as a non-aqueous electrolyte (non-aqueous electrolyte solution). As a solvent that was used in this LiPF$_6$ solution, a solvent obtained by mixing ethylene carbonate and diethyl carbonate in a volume ratio of 1:1 and adding 2% vinylene carbonate thereto as an additive was used.

A laminate-type cell was produced using the test electrode, the counter electrode, and the non-aqueous electrolyte produced as described above and was used as a battery of each of the examples and the comparative examples.

Evaluation of Positive Electrode Materials

For the positive electrode materials obtained in the examples and the comparative examples and the components that the positive electrode materials contained, the physical properties were evaluated. The evaluation methods are as described below. The results are shown in Table 1.

(1) Amount of Carbon

The amount of carbon (% by mass) in the carbonaceous coated active material was measured using a carbon analyzer (manufactured by Horiba, Ltd., carbon & sulfur Analyzer EMIA-810W).

(2) Crystallite Diameter

The crystallite diameter of the active material was calculated from the Scherrer's formula using the full width at half maximum and the diffraction angle (2θ) of the diffraction peak of a (020) plane of a powder X-ray diffraction pattern measured by X-ray diffraction measurement (manufactured by Rigaku Corporation, X-ray diffractometer: RINT2000).

(3) Raman Characteristics of Carbon

Raman spectroscopic measurement of carbon that is contained in the positive electrode material was carried out using a Raman microscope (manufactured by Horiba, Ltd., Raman microscope XploRA PLUS).

A wavelength of 538 nm was used as the measurement wavelength, and the spectroscopic measurement was carried out between 1500 and 3500 cm$^{-1}$. The peak was separated at 2000 to 3500 cm$^{-1}$ and fitted as five types of Voigt functions. The peak was fitted using numerical calculation software, and parameters were set. As the five types of peaks, a peak 1 having a peak top present at 2200 to 2380 cm$^{-1}$, a peak 2 having a peak top present at 2400 to 2550 cm$^{-1}$, a peak 3 having a peak top present at 2600 to 2750 cm$^{-1}$, a peak 4 having a peak top present at 2850 to 2950 cm$^{-1}$, and a peak 5 having a peak top present at 3100 to 3250 cm$^{-1}$ were set. The Gaussian ratio of each peak, the peak intensity, the full width at half maximum of the peak, and the coefficient of determination of fitting were calculated with numerical calculation software. The average of the proportions of the Gaussian functions in the peak 3 and the peak 4 was calculated from the Gaussian ratios of the respective obtained peaks and is shown in the "Gaussian ratio" column of Table 1.

FIG. 1 shows the Raman spectra of carbon in the positive electrode material of Example 1, and FIG. 2 shows the Raman spectra of carbon in the positive electrode material of Comparative Example 1. It should be noted that, in both FIG. 1 and FIG. 2, the dotted lines (• • •) indicate fitting curves, the medium-dashed lines ( - - - ) indicate measurement values, the small-dashed lines (---) indicates the peak 1, the dashed-dotted lines (- • - • -) indicate the peak 2, the dashed-two dotted lines (- • • -• • -) indicate the peak 3, the solid lines (-) indicate the peak 4, and the large-dashed lines ( - - - ) (longer dashed lines than the medium-dashed line) indicate the peak 5.

Evaluation of Lithium Ion Secondary Batteries

The discharge capacities and the capacity retentions by a cycle test were measured using the lithium ion secondary batteries obtained in the examples and comparative examples. The cut-off voltage was set to 2.5 to 3.7 V (vs. carbon negative electrode). The results are shown in Table 1.

(1) Discharge Capacity

At an ambient temperature of 25° C., the charge current was set to 1 C, the discharge current was set to 10 C, and the discharge capacity was measured by constant-current charging and discharging.

The tolerance is 80 mAh/g or more.

(2) Capacity Retention

At an ambient temperature of 25° C., the discharge capacity was measured by constant-current charging and discharging with the charge current set to 2 C and the discharge current set to 2 C. The measured value was regarded as the initial discharge capacity. After that, the ambient temperature was set to 45° C., and constant-current charging and discharging were carried out 600 times with the charge current set to 2 C and the discharge current set to 2 C. After that, again, at the ambient temperature of 25° C., the discharge capacity was measured by constant-current charging and discharging one more time with the charge current set to 2 C and the discharge current set to 2 C. As a result, the discharge capacity after the cycle was obtained.

The capacity retention by a cycle test was calculated according to the following formula.

Cycle test capacity retention=discharge capacity after cycle/initial discharge capacity The tolerance is 70% or more.

TABLE 1

| | Coefficient of determination | Gaussian ratio | Peak with highest intensity | Full width at half maximum of peak 3 (cm$^{-1}$) | Full width at half maximum of peak 4 (cm$^{-1}$) | Amount of carbon (% by mass) | Crystallite diameter (nm) | 10 C discharge capacity (mAh/g) | Capacity retention (%) |
|---|---|---|---|---|---|---|---|---|---|
| Example 1 | 0.9995 | 99.2% | Peak 4 | 260 | 340 | 1.3 | 80 | 120 | 75 |
| Example 2 | 0.9997 | 99.5% | Peak 4 | 312 | 330 | 1.1 | 90 | 110 | 76 |
| Example 3 | 0.9996 | 99.1% | Peak 4 | 180 | 316 | 1.5 | 120 | 100 | 73 |
| Example 4 | 0.9997 | 97.0% | Peak 4 | 273 | 287 | 6.5 | 240 | 90 | 71 |
| Comparative Example 1 | 0.9961 | 49.7% | Peak 3 | 119 | 272 | 7.8 | 85 | 75 | 68 |
| Comparative Example 2 | 0.9996 | 100.0% | Peak 4 | 335 | 362 | 8.5 | 45 | 70 | 72 |
| Comparative Example 3 | 0.9944 | 1.9% | Peak 3 | 95 | 123 | 0.4 | 150 | 40 | 51 |

Summary of Results

As is clear from Table 1, not only the battery manufactured using the positive electrode material of Comparative Example 3 in which the average of the proportions of the Gaussian functions in the peak 3 and the peak 4 was 0%, but also the battery obtained using the positive electrode material of Comparative Example 1 in which the average was slightly below 70% were not excellent in terms of the charging and discharging characteristics and the cycle characteristics. In addition, the battery manufactured using the positive electrode material of Comparative Example 2 in which the average of the proportions of the Gaussian functions in the peak 3 and the peak 4 was 100% had a high capacity retention, but had a small discharge capacity.

In contrast, it is found that the batteries obtained using the positive electrode materials of the examples in which the average of the proportions of the Gaussian functions in the peak 3 and the peak 4 was 70% or more and less than 100% had a high discharge capacity and a high capacity retention and were excellent in terms of the charging and discharging characteristics and the cycle characteristics.

INDUSTRIAL APPLICABILITY

The positive electrode material for a lithium ion secondary battery of the present invention is useful as a positive electrode of a lithium ion secondary battery.

What is claimed is:

1. A positive electrode material for a lithium ion secondary battery comprising:
   carbon,
   wherein, when a peak of the carbon that is measured by Raman scattering and is present at 2200 to 3400 cm$^{-1}$ is peak-separated into peaks including five types of Voigt functions of
   a peak 1 having a peak top present at 2200 to 2380 cm–1,
   a peak 2 having a peak top present at 2400 to 2550 cm–1,
   a peak 3 having a peak top present at 2600 to 2750 cm–1,
   a peak 4 having a peak top present at 2850 to 2950 cm–1, and
   a peak 5 having a peak top present at 3100 to 3250 cm–1,
   an average of proportions of Gaussian functions in the peak 3 and the peak 4 is 90% or more and less than 100%.

2. The positive electrode material for a lithium ion secondary battery according to claim 1,
   wherein, in the peak separation, a coefficient of determination with the measured peak of Raman scattering of carbon is 0.998 or more.

3. The positive electrode material for a lithium ion secondary battery according to claim 1,
   wherein, in the peak separation, an intensity of the peak top of the peak 4 is a highest, a full width at half maximum of the peak 3 is 150 cm$^{-1}$ or more and 330 cm$^{-1}$ or less, and a full width at half maximum of the peak 4 is 280 cm$^{-1}$ or more and 360 cm$^{-1}$ or less.

4. The positive electrode material for a lithium ion secondary battery according to claim 1, further comprising:
   an active material including an olivine-structured primary particle coated with a carbonaceous film containing the carbon or a granulated body thereof,
   wherein an amount of the carbon is 0.5% by mass or more and 7% by mass or less.

5. The positive electrode material for a lithium ion secondary battery according to claim 1,
   wherein a crystallite diameter analyzed by X-ray diffraction is 50 nm or more and 250 nm or less.

6. A positive electrode for a lithium ion secondary battery comprising:
   an electrode current collector; and
   a positive electrode mixture layer formed on the electrode current collector,
   wherein the positive electrode mixture layer contains the positive electrode material for a lithium ion secondary battery according to claim 1.

7. A lithium ion secondary battery comprising:
   a positive electrode;
   a negative electrode; and
   a non-aqueous electrolyte,
   wherein the positive electrode for a lithium ion secondary battery according to claim 6 is provided as the positive electrode.

* * * * *